United States Patent [19]

Wiersma et al.

[11] Patent Number: 5,415,893
[45] Date of Patent: May 16, 1995

[54] DISPERSION OF ELECTRICALLY CONDUCTIVE PARTICLES IN A DISPERSING MEDIUM

[76] Inventors: Aaltie E. Wiersma, Kast. Schaloenstraat 19, 6222 TN Maastricht; Lucia M. A. van de Steeg, Maaslaan 87, 6163 KN Geleen, both of Netherlands

[21] Appl. No.: 125,245

[22] Filed: Sep. 23, 1993

[30] Foreign Application Priority Data

Sep. 24, 1992 [NL] Netherlands ............ 9201657

[51] Int. Cl.⁶ .......................... B05D 3/02; H01B 1/00; C08G 73/00; C08G 75/00
[52] U.S. Cl. ................... 427/385.5; 523/201; 524/377; 524/378; 528/377; 528/422; 252/500; 252/511
[58] Field of Search ............... 524/377, 378; 252/500, 252/511, 512; 523/200, 201; 528/377, 422; 427/385.5; 428/357

[56] References Cited

U.S. PATENT DOCUMENTS

| | | | |
|---|---|---|---|
| 4,920,187 | 4/1990 | Kashihara et al. | 526/193 |
| 4,981,729 | 1/1991 | Zaleski | 252/500 |
| 5,134,177 | 7/1992 | Aklonis et al. | 252/500 |
| 5,213,714 | 5/1993 | Kämpf et al. | 252/500 |
| 5,225,109 | 7/1993 | Feldhues et al. | 252/500 |
| 5,240,644 | 8/1993 | Barry, Jr. et al. | 528/422 |

FOREIGN PATENT DOCUMENTS

| | | |
|---|---|---|
| 275899 | 7/1988 | European Pat. Off. . |
| 446172 | 9/1991 | European Pat. Off. . |
| 2616790 | 12/1988 | France . |
| 9004256 | 4/1990 | WIPO . |

OTHER PUBLICATIONS

English language Abstract of JP-A-2-273,407 (Nov. 7, 1990).

*Primary Examiner*—Tae H. Yoon
*Attorney, Agent, or Firm*—Cushman Darby & Cushman

[57] ABSTRACT

The invention relates to a dispersion of electrically conductive particles, comprising a binder and an electrically conductive polymer, and a stabiliser in a dispersing medium. The dispersion according to the invention is characterised in that the particles contain a non-ionic stabiliser. It has been found that the stability of the dispersion according to the invention is very good. In addition the dispersion according to the invention is extremely suitable for providing objects with a coating in a simple manner. The applied coating has good electrically conductive properties as well as good coating properties. The applied coating is homogeneously distributed over the coated object. Moreover the applied coating appears to adhere well to the object.

15 Claims, No Drawings

DISPERSION OF ELECTRICALLY CONDUCTIVE PARTICLES IN A DISPERSING MEDIUM

The invention relates to a dispersion of electrically conductive particles, comprising a binder and an electrically conductive polymer in a dispersing medium.

Such a dispersion is known from FR-A-2616790. The dispersion described herein contains electrically conductive particles in a dispersing medium. The particles have a core, which contains a binder, and a shell, which contains an electrically conductive polymer. The dispersion of electrically conductive particles is obtained by polymerising monomers to an electrically conductive polymer in the presence of a dispersion of binder particles. The binder is a thermoplastic polymer and doping groups are present on the surface of the binder particles yielding a dispersion of electrically conductive particles that has homogeneous properties as far as the size and composition of the particles is concerned. The dispersion of electrically conductive particles known from FR-A-2616790 can be used for example to provide non-conductive objects with an electrically conductive coating.

According to FR-A-2616790 doping groups are required to be present on the surface of the binder particles. Dispersions of polymers known to be non-doping do not meet this requirement and dispersions of conductive particles having a core of these polymers are hence not obtainable by the teaching of FR-A-2616790. It was found moreover, that dispersions of doping polymers in many cases tend to become destabilised when the monomer that has to be polymerised to the electrically conductive polymer or ionic compounds, like the oxidant, required to induce the polymerisation, and doping agents bringing a high and stable conductivity into the conductive polymer are added to the dispersion. The same unwanted effect was found to occur when the said components, required to obtain a conductive polymer are added to a dispersion of a non-doping polymer, stabilised with an anionic or cationic stabiliser. Also these dispersions become unstable by the addition of ionic compounds like oxidants, serving as polymerisation catalyst or doping agents. It is therefore in many cases not possible to effect the polymerisation of monomers into an electrically conductive polymer in a dispersion of the known binder particles of a doping polymer and virtually never in a dispersion of a non-doping polymer.

Because of this it is not really possible to obtain a dispersion of electrically conductive particles that contain a binder of a non-doping polymer and an electrically conductive polymer and is also impossible in many cases to add ionic compounds to the dispersion of the binder particles during the preparation of the dispersion of electrically conductive particles known from FR-A2616790 without adversely affecting the stability of the dispersion.

The aim of the present invention is to provide a stable dispersion of electrically conductive particles, which contain a binder of a doping or a non-doping polymer and an electrically conductive polymer. The dispersion of electrically conductive particles according to the invention is characterised in that the electrically conductive particles contain a non-ionic stabiliser.

It has been found that the dispersion of electrically conductive particles according to the invention is very stable, even when the dispersion contains ionic compounds. It is possible to add ionic compounds, such as catalysts and doping agents, without adversely affecting the stability of the dispersion of binder particles, during the preparation of the dispersion of electrically conductive particles according to the invention. It is possible to use in the dispersion of electrically conductive particles according to the invention without requirements being imposed on the doping properties of the binder. The invention also provides electrically conductive particles containing a non-doping polymer as a binder, which could not be obtained according to the known process of FR-A-2616790.

The dispersion of electrically conductive particles according to the invention is also suitable for providing objects with a coating in a simple manner. The dispersion can be homogeneously applied to the object in a simple manner and leaving the desired coating after removal of the dispersing medium. The obtained coating has good electrically conductive properties. Moreover the coating appears to have good adhesive properties with respect to a diversity of materials.

The dispersion of electrically conductive particles according to the invention is for example obtained by polymerising monomers into an electrically conductive polymer in the presence of a dispersion of binder particles stabilised with a non-ionic stabiliser. A non-ionic stabiliser is uncharged under the prevailing conditions. The non-ionic stabiliser can be chosen within a wide range and may be either physically adsorbed to the binder particles (physically bound) or incorporated in the binder (chemically bound). The non-ionic stabiliser is for example chosen from the group comprising alkylamines, alkylamides, (ethoxylated) alkyl alcohols, alkylamines, alkylamides, (ethoxylated) alkyl alcohols, alkylpyrrolidones, (ethoxylated) alkyl phenols, polyoxyalkyl esters, polyoxyalkyl ethers, glycol alkyl ethers, glycerol alkyl ethers, fatty acid esters and (ethoxylated) sorbitan alkylates, (hydroxy(m)ethyl)cellulose and other cellulose compounds known as 'protective colloids', polyvinyl alcohols, polyvinyl pyrrolidones and polyacrylamides. It is preferable to use polyoxyalkyl ethers because of their high effectivity. Extremely suitable polyoxyalkyl ethers are for example polyoxyethylene ethers, such as polyethylene glycol, alkoxypolyetheylene glycol, such as methoxypolyethylene glycol and ethylene oxide propylene oxide copolymers. In other cases polyoxyalkyl esters are preferred because of their low toxicity. Helmut Stache and Kurt Kosswig give a survey of non-ionic stabilisers in the Tensid-Taschenbuch, Carl Hanser Verlag Wien, 1990.

Optionally the dispersion of binder particles also contains a minor amount of anionic stabilisers, cationic stabilisers and/or stabilisers that contain a non-ionic part as well as an ionic part. Preferably the non-ionic part contains at least 10 carbon atoms. Frequently used anionic stabilisers are for example alkyl sulphates and alkyl sulphonates, ethoxylated alkyl sulphates, alkyl sulphonates and alkyl phosphates, ethoxylated alkyl carboxylic acids and alkylphenol carboxylic acids, ethoxylated alkylphenol sulphates and alkyl phenol sulphonates, sulphosuccinates and salts of carboxylic acid. Frequently used cationic stabilisers are primary, secondary, tertiary and quaternary ammonium salts, alkylpyridinium salts and acetylated polyamines.

Suitable non-ionic stabilisers usually have a weight average molecular weight of between 100 and 1,000,000 g/mol, preferably between 500 and 5,000 g/mol. A polymeric non-ionic stabiliser suitable for the invention is usually composed of monomeric units containing 1–50 carbon atoms. Preferably this is 1–20 carbon atoms. Optionally the polymeric non-ionic stabiliser contains several units that contain different numbers of carbon atoms. An example of such a stabiliser is an ethylene oxide/propylene oxide copolymer. The non-ionic stabiliser may have been added to the dispersion of binder particles in the usual manner.

Preferably the non-ionic stabiliser is chemically bound to the binder used. Chemically bound stabilisers provide a better stability of the dispersion of binder particles during the described process. This can be effected by incorporating units of the non-ionic stabiliser in the binder by adding the non-ionic stabiliser during the manufacturing of the binder. It is also quite possible to graft the non-ionic stabiliser onto already manufactured binder particles. The dispersion of binder particles usually contains between 1 and 50 weight percent non-ionic stabiliser, relative to the total weight of binder and stabiliser. Preferably this is 5–25 weight percent. Dispersions of smaller particles usually require less stabilizer than dispersions of larger particles.

The lower limit is imposed by the requirement that the dispersion is sufficiently stabilized. Amounts of stabilizer, beyond the upper limit can deteriorate the conducting and coating properties of the dispersion.

A non-doping polymer is preferably used as a binder in the dispersion according to the invention. This has the advantage over the use of doping polymers that a doping process can be dispensed with. Preferably the non-doping polymer has good coating properties. Such a polymer is for example chosen from the group comprising alkyd resins, polyester resins, amino resins, phenolic resins, polyurethane resins, epoxy resins, acrylate resins, cyclic rubbers, such as polyisoprene, natural rubber, silicone resins, polyvinyl chlorides, (poly)vinyl esters, polyvinyl acetate, polyolefines, which for example contain units chosen from the group comprising ethylene, propylene, butadiene and styrene, and hydrocarbon resins, such as (co)polymers of cyclopentadiene.

The alkyd resins that can be used as the binder in the dispersion are for example composed of polyols chosen from the group comprising glycerol, pentaerythritol, ethylene glycol, sorbitol, trimethylolethane, trimethylolpropane, dipentaerythritol, tripentaerythritol, neopentyl glycol and diethylene glycol, and polycarboxylic acids or derivatives thereof, for example chosen from the group comprising phthalic anhydride, phthalic acid, isophthalic acid, maleic acid, maleic anhydride, fumaric acid, fumaric anhydride and fatty acids, such as linoleic acid and oleic acid. Possible preparation methods for the alkyd resins are known to a person skilled in the art and are described for example by H.F. Mark et al. in the Encyclopedia of Chemical Technology, 1978, vol. 2, pp. 18–50.

Suitable polyester resins are for example composed of dicarboxylic acid units or derivatives thereof, chosen from the group comprising maleic anhydride, fumaric acid, adipic acid, phthalic acid, isophthalic acid, terephthalic acid, tetrahydrophthalic acid and tetrachlorophthalic acid and diol units, for example chosen from the group comprising 1,2-propanol, 1,3-butanol, ethylene glycol, neopentyl glycol, diethylene glycol, bisphenol A and tricyclodecane dimethanol. Optionally monofunctional and/or trifunctional monomeric units may also be used. Possible preparation methods for the polyester resins are known to a person skilled in the art and are described for example by the Oil and Colour Chemists' Association, Australia in 'Surface coatings, Vol. 1—Raw materials and their usage', Chapman and Hall Ltd, 1983, pp. 78–87.

Suitable epoxy resins are for example derived from bisphenol A and epichlorohydrin. Epoxidized aliphatic and cycloaliphatic dienes, such as 3,4-epoxycyclohexyl-methyl-3,4-epoxycyclohexane carboxylate and 4-epoxyethyl-1,2-epoxycyclohexane, may also be used. Possible preparation methods for epoxy resins are known to a person skilled in the art and are described for example in Ullman's Encyclopedia of Industrial Chemistry, 1985, Vol. A9, pp. 547–563.

Suitable polyurethane resins are for example reaction products of isocyanates and polyols. The isocyanates are for example chosen from the group comprising 1,6-hexamethylene diisocyanate, polymethylenepolyphenyl isocyanate, 4,4'-methylenebis(phenyl isocyanate), 1,5-naphthalene diisocyanate, bitolylene diisocyanate, methylene bis(cyclohexyl isocyanate), isophorone diisocyanate, trimethylhexamethylene diisocyanate, m-xylylene diisocyanate, 1,3-bis-(isocyanatomethyl)cyclohexane and 1,4-bis-(isocyanatomethyl)cyclohexane. The polyols are usually chosen from the group comprising polyether polyols and polyester polyols. Possible preparation methods for polyurethane resins are for example described in Kirk Othmer's Encyclopedia of Chemical Technology, 1982, Vol. 23, pp. 576–608.

A dispersion of a polyurethane resin can for example be stabilised by applying polyoxyethylene segments to the polyurethane chain, as for example described by J.W. Rosthauser et al. in Advances in Urethane Science and Technology, 1987, Stanford, Vol. 10, pp. 121–162, and by D. Dieterich in Progress in Organic Coatings, 1981, Vol. 9, pp. 291–332. The segments can be composed of modified diol or isocyanate units but it is also possible to apply monohydroxyfunctional polyoxyethylene polyethers directly to the polyurethane chain.

Suitable amino resins are for example reaction products of formaldehyde and compounds containing an amino group, such as melamine, benzoguanamine, glycoluril and urea. Amino resins and their preparation methods are for example described by the Oil and Colour Chemists' Association, Australia, in 'Surface coatings, Vol. 1—Raw materials and their usage', Chapman and Hall Ltd, 1983, pp. 87–98.

Suitable phenolic resins are for example reaction products of a phenol compound and an aldehyde compound, or derivatives thereof. The phenol compound is for example chosen from the group comprising phenol, o-cresol, 2,4-xylenol, bisphenol A, p-phenylphenol and p-tertiary-butylphenol. The aldehyde compound is for example formaldehyde. Phenolic resins and their preparation methods are for example described by the Oil and Colour Chemists' Association, Australia, in 'Surface coatings, Vol. 1—Raw materials and their usage', Chapman and Hall Ltd, 1983, pp. 99–104.

Suitable silicone resins are for example hydrolysis products of di- or trifunctional chlorosilanes. To this end the chlorosilanes are for example dissolved in an organic solvent, such as toluene or xylene, and then hydrolysed with water. Silicone resins can also be prepared by treating alkoxysilanes, such as methoxy-, ethoxy- and/or propoxy-silanes, with a strong acid in an aqueous medium and then causing polymerisation to take place. Silicone resins and their preparation methods are for example described by the Oil and Colour Chemists' Association, Australia, in 'Surface coatings, Vol. 1—Raw materials and their usage', Chapman and Hall Ltd, 1983, pp. 134–143.

Suitable acrylate resins are for example prepared through homopolymerisation of (meth)acrylate monomers, for example methylmethacrylate, ethylmethacrylate or ethylacrylate, or copolymerisation of these monomers with monomers which can react with them, for example acrylonitrile, methacrylamide, maleic anhydride, aliphatic chains with a terminal acrylate group, methacrylic acid, vinyl acetate or styrene. Acrylate resins and their preparation methods are for example described by the Oil and Colour Chemists' Association, Australia, in 'Surface coatings, Vol. 1—Raw materials and their usage', Chapman and Hall Ltd, 1983, pp. 144–157.

Optionally a mixture of several of the aforementioned binders is used in the dispersion. It is also possible to use hybrid systems.

The binder in the dispersion is optionally provided with so-called functional groups. By causing these functional groups to react, for example during the drying of the dispersion, preferably by evaporation of the dispersing medium, the binder can for example be cross-linked or can be adhered to a substrate. These functional groups include for example an OH, an $NH_2$, an NCO, an epoxy, an N-methylal, a phosphate, a sulphate and/or a carboxylate functionality.

The dispersion of binder particles has a weight average particle size that usually lies between 10 nm and 10 $\mu$m. Preferably this particle size lies between 10 nm and 3 $\mu$m. The solids content of the dispersion of binder particles is usually between 1 and 90 wt. %.

The dispersion of electrically conductive particles according to the invention is prepared in for example the following manner. The monomeric units from which the electrically conductive polymer is composed are added to a dispersion, already stabilised by a non-ionic stabiliser, of binder particles in the dispersing medium. A polymerisation catalyst is also added. The order in which the different components are added to the dispersion of binder particles is not important in the framework of the invention. In the presence of a polymerisation catalyst the monomeric units polymerise to form an electrically conductive polymer. In this process the monomers can for example polymerise in the dispersing medium to form an electrically conductive oligomer or polymer, after which the electrically conductive oligomer or polymer—which is relatively poorly soluble in the dispersing medium—precipitates onto the stabilised binder particles. As a result a dispersion of electrically conductive particles is obtained, which contain an electrically conductive polymer that is substantially adsorbed to the surface of the binder particles. In addition the dispersion of electrically conductive particles may contain freely present electrically conductive polymer.

The temperature at which the dispersion of electrically conductive particles according to the invention is prepared is usually between $-50°$ and $200°$ C., preferably between $-10°$ and $80°$ C. The preparation time is usually between a few seconds and a few days, dependent on the rate at which the polymerisation reaction of the monomeric units to the electrically conductive polymer takes place.

A person skilled in the art selects the polymerisation catalyst which is usually added to the dispersion of binder particles for example from the group comprising inorganic acids, for example hydrochloric acid, sulphuric acid, chlorosulphonic acid and nitric acid, Lewis acids, for example compounds containing positive ions of iron, aluminium, tin, titanium, zirconium, chromium, manganese, cobalt, copper, molybdenum, wolfram, ruthenium, nickel, palladium and/or platinum, and a halogen, a sulphate, a nitrate, an arylsulphonate and/or an acetylacetonate. Other suitable catalysts are for example ozone, diazonium salts, organic catalysts, for example benzoquinone and anthraquinone. In certain polymerisation reactions Ziegler-Natta catalysts and compounds like $K_2Cr_2O_7$, $K_2S_2O_8$, $Na_2S_2O_8$, $NaBO_3$, $H_2O_2$, $NOBF_4$, $NO_2BF_4$, $NO_2FP_6$, $NOClO_4$, $NOAsF_6$, $NOPF_6$ and $(NH_4)_2S_2O_8$ are also effective. Examples of effective catalysts are $FeCl_3$, $FeBr_3$, $FeCl_3.6H_2O$, $CuSO_4$, $Fe(NO_3)_3.9H_2O$, $CuCl_2.2H_2O$, $K_3Fe(CN)_6$, $Cu(NO_3)_2$, $Fe(BF_4)_3$, $Fe(ClO_4)_3.9H_2O$, $Fe_2(SO_4)_3.5H_2O$, $Fe_2(SiF_6)_3$, $Cu(ClO_4)_2$, $Cu(BF_4)_2$, $CuSiF_6$, $RuCl_3$, $MoCl_5$, $WCl_6$ and $(C_5H_5)_2Fe^+FeCl_4^-$. Optionally use is made of a mixture of different catalysts. The catalyst or catalyst mixture is usually added in a molar ratio relative to the monomer that lies between 1:10 and 10:1. Preferably this ratio lies between 1:3 and 3:1. Iron(III) compounds, especially iron(III) chloride are particularly preferable as oxidizing catalyst when polypyrrole is prepared. It is preferred to add also doping compounds that give higher conductivity and better stability of the conductivity in time to the conductive polymer. Compounds having the desired effect are for instance paratoluenesulphonic acid and salts and substituted forms thereof and anthraquinone. Excess oxidant and dispersant preferably are removed from the dispersion after the polymerisation of the conductive polymer by ultrafiltration centrifuging, precipitation or other separation techniques known per se.

The monomeric units from which the eventual electrically conductive polymer in the dispersion of electrically conductive particles according to the invention is composed are for example chosen from the group comprising pyrrole, thiophene, indole, carbazole, furan, benzene, aniline, acetylene, and derivatives of these monomers. In view of the level and the stability of the conductive properties an electrically conductive polymer composed of pyrrole, thiophene or aniline units or derivatives of these monomers is preferable.

Examples of derivatives of these monomers are N-methylpyrrole, N-ethylpyrrole, N-n-propylpyrrole, N-n-butylpyrrole, N-phenylpyrrole, N-tolylpyrrole, N-naphthylpyrrole, 3-methylpyrrole, 3,4-dimethylpyrrole, 3-ethylpyrrole, 3-n-propylpyrrole, 3-n-butylpyrrole, 3-phenylpyrrole, 3-tolylpyrrole, 3-naphthylpyrrole, 3-methoxypyrrole, 3,4-dimethoxypyrrole, 3-ethoxypyrrole, 3-n-propoxypyrrole, 3-phenoxypyrrole, 3-methyl-N-methylpyrrole, 3-methoxy-N-methylpyrrole, 3-chloropyrrole, 3-bromopyrrole, 3-methylthiopyrrole, 3-methylthio-n-methylpyrrole, 2,2'-bithiophene, 3-methyl-2,2'-bithiophene, 3,3'-dimethyl-2,2'-bithiophene, 3,4-dimethyl-2,2'-bithiophene, 3,4-dimethyl-3',4'-dimethyl-2,2'-bithiophene, 3-methoxy-2,2'-bithiophene, 3,3'-dimethoxy-2,2'-bithiophene, 2,2',5,2''-terthiophene, 3-methyl-2,2'5',-2''terthiophene, 3,3'-dimethyl-2,2',5',2''-terthiophene, 2-cyclohexylaniline, aniline, 4-propanoylaniline, 2-(methylamino)aniline, 2-(dimethylamine)aniline, o-toluidine, 4-carboxyaniline, n-methylaniline, m-hexylaniline, 2-methyl-4-methoxycarbonylaniline, n-propylaniline, n-hexylaniline, m-toluidine, o-ethylaniline, m-ethylaniline, o-ethoxyaniline, m-butylaniline, 5-chloro-2-ethoxyaniline, m-octylaniline, 4-bromoaniline, 2-bromoaniline, 3-bromoaniline, 3-acetamidoaniline, 4-acetamidoaniline, 5-chloro-2-methoxyaniline, 2-acetylaniline, 2,5-dimethylaniline, 2,3-dimethylaniline, N,N-dimethylaniline, 4-benzylaniline, 4-aminoaniline, 2-methylthiomethylaniline, 4-(2,4-dimethylphenyl)aniline, 2-ethylthioaniline, n-methyl-2,4-dimethylaniline, n-propyl-m-toluidine, n-methyl-o-cyanoaniline, 2,5-dibutylaniline, 2,5-dimethoxyaniline, o-cyanoaniline, tetrahydronaphthylamine, 3-(n-butanesulphonic acid) aniline, 2-thiomethylaniline, 2,5-dichloroaniline, 2,4-dimethoxyaniline, 3-propoxymethylaniline, 4-mercaptoaniline, 4-methylthioaniline, 3-phenoxyaniline, 4-phenoxyaniline, n-hexyl-m-toluidine, 4-phenylthioaniline, n-octyl-m-toluidine, tetrahydrobenzo[c]-thiophene, 4-trimethylsilylaniline and 3,4-(alkylene-vic-dioxy)thiophene.

Optionally the electrically conductive polymer is composed from a mixture of several of the aforementioned monomeric units.

The dispersing medium is chosen so that both the binder and the electrically conductive polymer do not or virtually not dissolve in it. The catalyst and the monomeric units from which the electrically conductive polymer is composed can however dissolve in the dispersing medium. The dispersing medium is often chosen from the group comprising water, aromatic compounds, for example benzene, toluene and xylene, alcohols, for example methanol and ethanol, hydrocarbons, for example pentane and hexane, ethers, for example dioxane, diethylether, ethyl methyl ether and tetrahydrofuran, ketones, for example acetone, diethyl ketone and methyl ethyl ketone, halogenated compounds, for example $CHCl_3$, $CH_2Cl_2$ and hydrocarbon tetrachloride, esters, for example ethylformiate and ethylacetate and compounds like acetonitrile, nitromethane, dimethyl sulphoxide, dimethylformamide, triethylphosphate, dimethylacetamide and pyridine. It is also possible to use a mixture of several dispersing mediums. For environmental reasons it is preferable to use water as the dispersing medium.

In a special embodiment the aforementioned monomers are obtained via in-situ deblocking of precursor monomers. A precursor monomer is a molecule that is incapable of polymerising as such due to the presence of a substituting group at one of the places involved in the polymerization. After a simple conversion step this molecule is however converted into a polymerisable monomeric unit. This conversion step may comprise the removal of a blocking group which shields one or more reactive sites. The removal of an electron-attracting group which increases the oxidation potential of the molecule, as a result of which polymerisation is prevented, is also possible. In another embodiment an intramolecular reaction takes place, for example a retro-Dieis-Alder reaction, to convert a precursor monomer into a polymerisable monomeric unit. Any precursor monomer which after activation becomes a polymerisable monomeric unit from which an electrically conductive polymer can be formed is suitable for use.

Examples of suitable precursor monomers are molecules having a structure according to Formula (I):

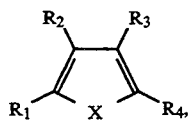

Formula (I)

where X is

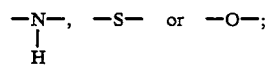

$R^1$ is hydrogen, —C(O)OH, —C(O)C(O)OH, —C(O)H, —$SO_3H$, —I or Br;

$R^2$ is hydrogen, an alkyl group (with 1-10 carbon atoms), —C(O)OH or a halogen;

$R^3$ is hydrogen, an alkyl group (with 1-10 carbon atoms), —C(O)OH or a halogen;

$R^4$ is hydrogen, —C(O)OH, —C(O)C(O)OH, —C(O)H, —$SO_3H$, —I or —Br;

$R^5$ is hydrogen or an alkyl, aryl, alkoxy or silyl group; on the understanding that $R^1$ and $R^4$ are not simultaneously hydrogen and that $R^2$ and $R^3$ may both form part of a closed ring structure.

Preferably use is made of pyrrole-2-carboxylic acid. The synthesis of this precursor monomer is described in J. Am. Pharm. Assoc. 45, 509 (1956).

All combinations of X, $R^1$, $R^2$, $R^3$ and $R^4$, not excluded above, are possible. Groups $R^1$ and $R^4$ may be thermally or photochemically eliminated with the formation of a pyrrole, whether or not substituted at position $R^2$ and/or $R^3$, a thiophene or a furan monomer. This precursor monomer is hence deblocked and can then freely polymerise via the $R^1$ and $R^4$ positions. Groups $R^2$ and $R^3$ may be the same or different. Groups $R^2$ and $R^3$ may also both form part of a closed ring structure. A suitable example of such a precursor monomer is 3,4-(alkylene-vic-dioxy-)thiophene-2,5-dicarboxylic acid.

Other suitable precursor monomers with which an electrically conductive polymer can be prepared are precursor monomers having a structure according to Formula (II):

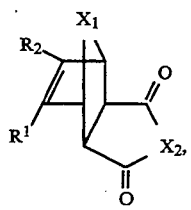

Formula (II)

where $X^1$ and $X^2$ are the same or different and are

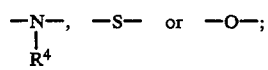

$R^1$ and $R^2$ are the same or different and are hydrogen or an alkyl group with 1-10 carbon atoms;

$R^4$ is hydrogen or an alkyl, aryl or alkoxy group.

The precursor monomers according to Formula (II) can for example be synthesized as described in J. Chem. Soc. Perkin Trans. I (1985), pp. 1277-1284. Another suitable precursor monomer is 4-aminobenzoic acid (see P. Ruelle, 7.Chem. Soc. Perkin trans. II, 1953 (1986)). It is also possible to use 3,4-disubstituted thiophenes (see for example U.S. Pat. No. 4,987,042).

Combinations of all kinds of precursor monomers are possible. Optionally use can also be made of precursor oligomers. The precursor monomers can for example be activated via a thermal or a photochemical treatment.

The weight ratio of the electrically conductive polymer and the binder may vary within a wide range, dependent on the desired electrically conductive properties on the one hand and the coating properties on the other. Usually this ratio lies between 0.1:99.9 and 80:20; preferably it lies between 0.1:99.9 and 20:80; more preferably it lies between 0.1:99.9 and 10:90.

Dependent on the electrically conductive polymer obtained the electrically conductive properties can be improved via an (oxidative or reductive) doping step, by using the known doping methods and doping reagents. They are for example mentioned in the 'Handbook of conducting polymers' (T.A. Skotheim, Marcel Dekker Inc., New York, USA (1986)). Doping is effected for example by adding a doping agent to the dispersion of electrically conductive particles.

Optionally up to 60 and even up to 90 wt. % fillers and/or antioxidants can be added to the dispersion of electrically conductive particles according to the invention. Examples of fillers to be added are talc, barium sulphate, calcium carbonate, fibres, (light-absorbing) pigments, for example titanium white and coloured pigments such as iron oxide and $SiO_2$, kaolin, wollastonite and glass. In addition adhesion-promoting agents, flow-promoting agents, thickeners, surface-improving agents, anti-foaming agents, anti-corrosion agents, hardeners, drying agents, conducting materials, for example soot, conducting fibres and conducting flakes, stabilisers and binders may be added. It is also possible to remove the dispersing medium from the dispersion of conductive particles, e.g. by freeze drying or evaporation, and to use those particles in common processing methods for solid polymeric materials.

The conductive coatings or other conductive products can be used as shielding material against electromagnetic interference and electrostatic discharges. Other applications are for example those mentioned in Progr. Org. Coat. 19, 21, 1991 by M. Aldissy and S.P. Armes.

A coating entirely or partly made from a dispersion according to the present invention can have a specific conductivity of at least $10^{-10}$ S/cm. More particularly, a coating can have a specific conductivity of at least $10^{-3}$ S/cm.

The invention is further elucidated with reference to the following examples and comparative experiments without being limited thereto.

The conductive properties of the products are for example determined with the aid of the so-called four-probe method. A detailed description is given by H. H. Wieder in Laboratory Notes on Electrical and Galvanomagnetic Measurements, Elsevier, New York, 1979. This method measures the specific conductivity:

$\sigma = (L/A) * (1/R)$ where $\sigma$ = specific conductivity [S/cm];
L = distance between the two inside electrodes [cm];
R = resistance [ohm];
A = cross-sectional area [cm²]

EXAMPLES AND COMPARATIVE EXPERIMENTS

Example I

A solution was prepared of 4.86 g of $FeCl_3$ (from Merck, free of water) in 21.25 g of demineralised water (solution A). Then a solution was prepared of 0.89 g of pyrrole (from Aldrich, vacuum distilled) in 19.34 g of demineralised water (solution B).

At a temperature of 20° C. solution A was added drop by drop to 20 g of a dispersion of polyurethane in water (Uraflex XP 401 UZ, DSM Resins, solids content 40%, average particle size 60 nm), which was stabilised by incorporated methoxypolyethyleneglycol chains ($M_w$=750 g/mole). The drops were added while the dispersion was stirred with the aid of a stirring bar. During the addition of the drops the temperature was kept at 20° C. The colour of the dispersion was yellow/green.

After half an hour's stirring solution B was added drop by drop, with stirring. After solution B had been added the colour of the dispersion changed to dark green and then to black.

After 20 hours' stirring at a temperature of 20° C. a portion of the dispersion was centrifuged for half an hour at 20,000 rpm. Then the supernatant layer of water was poured off and the sediment (2.63 g) was redispersed in 5.17 g of demineralised water with the aid of an Ultra-Torrax T 25 (Janke & Kunkel JK Labortechnik). The dispersion thus obtained was then spread out to a fluid film on a glass plate and dried to the air at room temperature.

Finally the specific conductivity of the obtained film, that appeared to be homogeneous, was determined: 0.3 S/cm.

Example II

A solution was prepared of 10.88 g of $FeCl_3$ (from Merck, free of water) in 47.64 g of demineralised water (solution A). Then a solution was prepared of 2.11 g of pyrrole (from Aldrich, vacuum distilled) in 37.90 g of demineralised water (solution B).

In the same manner as in Example I the two solutions were added to 20 g of a dispersion of polyurethane in water (Uraflex XP 401 UZ, DSM Resins, solids content 40%, average particle size 60 nm), which was stabilised by incorporated methoxypolyethylene glycol chains ($M_w$=750 g/mole). After a portion of the dispersion had been centrifuged 3.42 g of sediment was redispersed in 5.68 g of demineralised water. The dispersion thus obtained was then spread out to a fluid film on a glass plate and dried to the air at room temperature. Finally the specific conductivity of the obtained film, that appeared to be homogeneous, was determined: 0.2 S/cm.

Example III

A solution was made of 2.30 g of $FeCl_3$ (from Merck, free of water) in 10.05 g of demineralised water (solution A). Then a solution was prepared of 0.46 g of pyrrole (from Aldrich, vacuum distilled) in 9.77 g of demineralised water (solution B).

In the same way as in Example I the two solutions were added to 20 g of a dispersion of polyurethane in water (Uraflex XP 401 UZ, DSM Resins, solids content 40%, average particle size 60 nm), which was stabilised by incorporated methoxypolyethylene glycol chains ($M_w$=750 g/mole). After it had been centrifuged, 1.99 g of sediment was redispersed in 3.97 g of demineralised water. The black dispersion thus obtained was then spread out to a fluid film on a glass plate and dried to the air at room temperature. Finally the specific conductivity of the obtained film, that appeared to be homogeneous, was determined: 0.07 S/cm.

Comparative Experiment A

A solution was prepared of 3.34 g of $FeCl_3$ (from Merck, free of water) in 15.0 g of demineralised water (solution A). Solution A was added drop by drop to 20 g of a dispersion of polyurethane in water (Uraflex ZB 2331, DSM Resins, solids content 40%, average particle size 100 nm), which was stabilised by ionic carboxyl groups on the polyurethane chain. During the addition of the drops the dispersion was stirred with the aid of a stirring bar. During the addition of the drops the temperature was kept at 20° C. After 1.15 g of $FeCl_3$ solution had been added the dispersion became unstable and lumps started to be formed. It proved impossible to obtain a homogeneously distributed film of this dispersion.

Example IV

A solution was prepared of 11.67 g of $FeCl_3$ (from Merck, free of water) in 57.92 g of demineralised water (solution A). Then a solution was prepared of 2.11 g of pyrrole (from Aldrich, vacuum distilled) in 32.38 g of demineralised water (solution B).

In the same manner as in Example I the two solutions were added to 20 g of an emulsion of alkyd resin in water (Uradil AZ 600, DSM Resins, solids content 42%, average particle size 300 nm), which was stabilised by incorporated methoxypolyethylene glycol chains ($M_w$=4,000 g/mole).

The drops were added while the dispersion was stirred with the aid of a stirring bar. During the addition of the drops the temperature was kept at 20° C. After centrifugation 3.42 g of sediment was redispersed in 5.68 g of demineralised water. The black dispersion thus obtained was then spread out to a film on a glass plate and dried to the air at a temperature of 70° C. Finally the specific conductivity of the obtained film, that appeared to be homogeneous, was determined: 0.06 S/cm.

Example V

A solution was prepared of 5.20 g of $FeCl_3$ (from Merck, free of water) in 25.80 g of demineralised water (solution A). Then a solution was prepared of 0.93 g of pyrrole (from Aldrich, vacuum distilled) in 18.96 g of demineralised water (solution B).

In the same manner as in Example IV the two solutions were added to 20 g of Uradil AZ 600, which was stabilised by incorporated methoxypolyethylene glycol chains ($M_w$=4,000 g/mole). The black redispersed sediment thus obtained was then spread out to a film on a glass plate and dried to the air at 70° C. Finally the specific conductivity of the obtained film, that appeared to be homogeneous, was determined: 0.01 S/cm.

Comparative Experiment B 1.3 g $FeCl_3$ solution (18 wt. % in water) was added drop by drop, with stirring, to 20.0 g of a dispersion of alkyd resin Z310 (DSM Resins, 60 wt. % solids; average particle size 534 nm), which was stabilised by 2 wt. % sodium dodecylbenzene sulphonate. The emulsion immediately became unstable.

Comparative Experiment C 3.4 g of an $FeCl_3$ solution (18 wt. % in water) was added drop by drop, with stirring, to 20.0 g of a dispersion of alkyd resin Z310 (DSM Resins, 5 wt. % solids; average particle size 534 nm), which was stabilised by 2 wt. % sodium dodecylbenzene sulphonate. The emulsion immediately became unstable.

Example VI 18.0 g of $FeCl_3$ solution (18 wt. % in water) was added drop by drop, with stirring, to 20.1 g of acrylate dispersion on the basis of methylmethacrylate, butylacrylate and methacrylic acid, stabilised by 7%-by weight of built-in methoxy poly(ethylene glycol) ($M_w$=750 g/mole) and emulgated by alkylbenzene sulphonate in an amount of 0.7%-by-weight with respect to the amount of acrylate. The average particle size is 495 nm. This acrylate will be denoted as Uramul PD/STA 71 in the following examples. Then the dispersion was stirred for 30 minutes at a temperature of 20° C. At the same temperature 11.6 g of pyrrole solution ( 5 wt. % in water) was then added drop by drop, with stirring. A stable black dispersion was formed. After centrifugation and redispersion of a portion of the black dispersion thus obtained was then spread out to a film on a glass plate and dried to the air at 80° C. Finally the specific conductivity of the obtained film, that appeared to be homogeneous, was determined: $2 * 10^{-5}$ S/cm.

Example VII 3.5 g of $FeCl_3$ solution (18 wt. % in water) was added drop by drop, with stirring, to 20.0 g of acrylate dispersion (Uramul PD/STA 71; 5.0 wt. % solids; average particle size 495 nm). Then the dispersion was stirred for 120 minutes at a temperature of 20° C. At the same temperature 2.3 g of pyrrole solution (5 wt. % in water) was then added drop by drop, with stirring. A stable black dispersion was formed.

Comparative experiment D

A solution was prepared of 4.99 g of $FeCl_3$ (from Merck, free of water) in 22.47 g of demineralised water (solution A). Then a solution was prepared of 0.89 g of pyrrole (from Aldrich, vacuum distilled) in 16.89 g of demineralised water (solution B).

After solution A had cooled to a temperature of 20° C. it was added drop by drop to 20.04 g of a dispersion of an acrylate resin in water (Uramul CP 3310 SC, DSM Resins, solids content 50%, average particle size 170 nm), which was stabilised by added ether sulphate. During the addition of the drops the dispersion was stirred with the aid of a stirring bar. During the addition of the drops the temperature was kept at 20° C. After half an hour's stirring solution B was then added drop by drop, with stirring. After 4.19 g of solution B had been added a black precipitate had been formed, which could not be redispersed.

Example VIII 19.90 g of a polyurethane dispersion in water (Uraflex XP 401 UZ, DSM Resins, solids content 40%, average particle size 60 nm), which was stabilised by incorporated methoxypolyethylene glycol chains ($M_w$=750), was introduced into a beaker and stirred with the aid of a stirring bar. The beaker was placed in a vessel containing ice. Then the dispersion was acidified by adding a HCl solution (1.37 g of 12 molar + 13.42 g of 1 molar) in water.

Then 0.89 g of aniline, dissolved in 17.03 g of 1M HCl, was added drop by drop, with stirring. Finally 1.61 g of $(NH_4)_2S_2O_8$, dissolved in 15.08 g of 1M HCl, was added with stirring.

After 24 hours the obtained dark green dispersion was centrifuged (20,000 rpm, 30 minutes). After centrifugation the aqueous phase was poured off and the sediment was redispersed. From this a coating was made, whose specific conductivity was measured after drying: 1.5 S/cm.

Example IX

A solution was prepared of 3.61 g of $FeCl_3$ (Merck, free of water) in 16.26 g of demineralised water (solution A). Then a solution was prepared of 0.60 g of pyrrole (from Aldrich, vacuum distilled) in 12.19 g of demineralised water (solution B).

In the same way as in Example I the two solutions were added to 20.06 g of vinyl acetate dispersion in water (Uramul VH10, DSM Resins, solids content 29%, stabilised with the aid of partly chemically bound hydroxymethyl cellulose, average particle size 550 nm).

After centrifugation 4.35 g of sediment was redispersed in 10.15 g of demineralised water. Of this dispersion a homogeneous coating was applied to a glass plate, after which, after drying at room temperature, the specific conductivity was measured: $6 * 10^{-5}$ S/cm.

Example X

A solution was prepared of 12.32 g of $Fe(NO_3)_3.9-H_2O$ (Janssen Chimica, p.a.) in 234.2 g of demineralized water (solution A). Subsequently, a solution was prepared of 0.89 g of pyrrole (Aldrich, vacuum distilled) in 43.6 g of distilled water.

Analogously to example I, both solutions were added to 20 g of a dispersion of polyurethane in water (Uraflex XP 401 UZ, DSM Resins, solids content 40%, average particle size 60 nm), stabilized by means of incorporated methoxy polyethylene glycol chains ($M_w$=750 g/mole). After the dispersion had been centrifuged for one hour at a speed of 14,000 rpm, the sediment was redispersed. The resulting dispersion was poured out onto a glass plate and dried (T=80° C. in $N_2$ environment), yielding a coating with a specific conductivity of 0.37 S/cm.

Example XI

Example X was repeated, solution A now consisting of 8.69 g of Fe(p-toluene sulphonate)$_3$ dissolved in 117.14 g of demineralized water. The coating prepared from this solution has a specific conductivity of 7.5 S/cm and the stability of its conductivity properties proved to be good.

Example XII

Example I was repeated, but during addition of solution A and solution B and during stirring the temperature was now kept between 0° and 5° C. by means of an ice bath.

The specific conductivity of the coating obtained after drying at a temperature of 80° C. was 2.5 S/cm.

Example XIII

Analogous to example X, the difference being that after addition of solution B stirring was applied for one hour, following which the dispersion was centrifuged.

The specific conductivity of the coating film obtained was 0.28 S/cm.

Example XIV 2.0 g of white pigment paste (31.5 mass % polyurethane dispersion (Uraflex XP 401 UZ from DSM Resins)), 52.5 mass % titanium dioxide (Tioxide TR 92 from Tioxide International)), 15.7 mass % water and 0.3 mass % anti-foaming agent (Tego foamex 7447 from Tego Chemie Service)) were added to 1.0 g of the dispersion of example X (solids content 12.9 mass %). After drying, a grey coating having a specific conductivity of $8 \times 10^{-3}$ S/cm was obtained.

Example XV

A solution was prepared of 0.75 g of $H_2O_2$ solution (Perhydrol 30% $H_2O_2$, p.a., from Merck) in 0.75 g of demineralized water (solution A). Subsequently, a solution was prepared of 2.58 g of p-toluene sulphonic acid monohydrate (99%, from Janssen Chimica) in 7.50 g of demineralized water (solution B). In addition, a solution was prepared of 0.01 g of $FeCl_3$ (from Merck, anhydrous) in 0.66 g of demineralized water (solution C).

At a temperature of 20° C. 0.45 g of pyrrole (from Aldrich, vacuum distilled) was added to a diluted acrylate dispersion (Uramul PD/STA 71; 5.0 wt. % solids), stabilized by means of 7 wt. % incorporated methoxy polyethylene glycol ($M_w$=750 g/mole). Addition took place while the dispersion was being stirred by means of a stirring bar. During addition the temperature was kept at 20° C.

After the pyrrole had dissolved, solutions A and B were added. Subsequently, solution C was added with stirring.

After four hours' stirring the dispersion was spread out on a glass plate to obtain a film, which was dried at a temperature of 80° C. under $N_2$. The specific conductivity of the film was found to be $1.1 \times 10^{-2}$ S/cm.

The examples show that the stability of dispersions whose binder is stabilised by means of a nonionic stabiliser is very good. The dispersions according to the invention are also very suitable for providing, in a simple manner, objects with a coating that has both good electrically conductive properties and good coating properties. The applied coating is homogeneously distributed over the coated object and moreover appears to adhere well to the object.

We claim:

1. A dispersion of electrically conductive particles in a dispersing medium, the electrically conductive particles comprising a binder of a non-doping polymer as a core, a non-ionic stabilizer which is chemically or physically bound to said binder and a shell thereover which is comprised of an electrically conductive polymer.

2. A dispersion according to claim 1, wherein the dispersion contains 1–50 wt. % non-ionic stabiliser, relative to the overall weight of binder and stabiliser.

3. A dispersion according to claim 1, wherein the weight average molecular weight of the non-ionic stabiliser lies between 500 and 5000 g/mol.

4. A dispersion according to claim 1, wherein the non-ionic stabiliser is composed of monomeric units containing 1–20 carbon atoms.

5. A dispersion according to claim 1, wherein the non-ionic stabiliser is chosen from the group consisting of polyoxyalkyl esters and polyoxyalkyl ethers.

6. A dispersion according to claim 5, characterised in that the non-ionic stabiliser is polyethylene glycol or methoxy polyethylene glycol.

7. A dispersion according to claim 1, wherein the weight ratio of the electrically conductive polymer and the binder lies between 0.1:99.9 and 20:80.

8. A dispersion according to claim 1, wherein the binder is chosen from the group consisting of alkyd resins, polyester resins, polyurethane resins, acrylate resins, vinylacetate containing resins and hybrid systems containing said resins.

9. A dispersion according to claim 1, wherein the electrically conductive polymer is composed of monomeric units chosen from the group consisting of pyrrole, thiophene, aniline, N-methylpyrrole, N-ethylpyrrole, N-n-propylpyrrole, N-n-butylpyrrole, N-phenylpyrrole, N-tolylpyrrole, N-naphthylpyrrole, 3-methylpyrrole, 3,4-dimethylpyrrole, 3-ethylpyrrole, 3-n-propylpyrrole, 3-n-butylpyrrole, 3-phenylpyrrole, 3-tolylpyrrole, 3-naphthylpyrrole, 3-methoxypyrrole, 3,4-dimethoxypyrrole, 3-ethoxypyrrole,, 3-n-propoxypyrrole, 3 -phenoxypyrrole, 3 -methyl-N-methylpyrrole, 3-methoxy-N-methylpyrrole, 3-chloropyrrole, 3 -bromopyrrole, 3 -methylthiopyrrole, 3-methylthio-n-methylpyrrole, 2,2′-bithiophene, 3-methyl-2,2′-bithiophene, 3,3′-dimethyl-2,2′-bithiophene, 3,4-dimethyl-2,2′-bithiophene, 3,4-dimethyl-3′,4′-dimethyl-2,2′-bithiophene, 3-methoxy-2,2′-bithigphene, 3,3′-dimethoxy-2,2′-bithiophene, 2,2′,5,2″-terthiophene, 3-methyl-2,2′,5′,-2″terthiophene, 3,3′-dimethyl-2,2′,5′,2‴-terthiophene, 2-cyclohexylaniline, aniline, 4-propanoylaniline, 2-(methylamino)aniline, 2-(dimethylamine)aniline, o-toluidine, 4-caroboxyaniline, n-methylaniline, m-hexylaniline, 2-methyl-4-methoxycarbonylaniline, n-propylaniline, n-hexylaniline, m-toluidine, o-ethylaniline, m-ethylaniline, o-ethoxyaniline, m-butylaniline, 5-chloro-2-ethoxyaniline, m-octylaniline, 4-bromoaniline, 2-bromoaniline, 3-bromoaniline, 3-acetamidoaniline, 4-acetamidoaniline, 5-chloro-2-methoxyaniline, 2-acetylaniline, 2,5-dimethylaniline, 2,3-dimethylaniline, N,N-dimethylaniline, 4-benzylaniline, 4-aminoaniline, 2-methylthiomethylaniline, 4-(2,4-dimethylphenyl)aniline, 2-ethylthioaniline, 2-methyl-2,4-dimethylaniline, n-propyl-m-toluidine, n-methyl-o-cyanoaniline, 2,5-dibutylaniline, 2,5-dimethoxyaniline, o-cyanoaniline, tetrahydronaphthylamine, 3-(n-butanesulphonic acid) aniline, 2-thiomethylaniline, 2,5-dichloroaniline, 2,4-dimethoxyaniline, 3 -propoxymethylaniline, 4-mercaptoaniline, 4-methylthioaniline, 3-phenoxyaniline, 4-phenoxyaniline, n-hexyl-m-toluidine, 4-phenylthioaniline, n-octyl-m-toluidine, tetrahydrobenzo-thiophene, 4-trimethylsilylaniline and 3,4-(alkylene-vic-dioxy)thiophene.

10. Process for the preparation of the dispersion according to 1, according to which the monomers are polymerised to an electrically conductive polymer in a dispersion of a binder, which contains a non-ionic stabiliser.

11. Coating entirely or partly made from the dispersion according to claim 1.

12. Coating according to claim 11, characterised in that the specific conductivity is at least $10^{-10}$ S/cm.

13. Coating according to claim 12, characterised in that the specific conductivity is at least $10^{-3}$ S/cm.

14. A process for preparing a conductive coating comprising
preparing a dispersion of electrically conductive particles in a dispersing medium, the electrically conductive particles comprising a binder of a non-doping polymer as a core, a non-ionic stabilizer which is chemically or physically bound to said binder and a shell thereover which is comprised of an electrically conductive polymer; and
applying said dispersion to form a conductive coating.

15. A process for preparing a conductive coating, comprising applying a dispersion according to claim 1.

* * * * *

UNITED STATES PATENT AND TRADEMARK OFFICE
CERTIFICATE OF CORRECTION

PATENT NO. : 5,415,893
DATED : May 16, 1995
INVENTOR(S) : WIERSMA

It is certified that error appears in the above-indentified patent and that said Letters Patent is hereby corrected as shown below:

Col. 7, line 54, change "Dieis" to --Diels--.

Col. 15, line 20, change "bithigphene" to --bithiophene--.

Signed and Sealed this

Third Day of October, 1995

Attest:

BRUCE LEHMAN

*Attesting Officer*  *Commissioner of Patents and Trademarks*